United States Patent
Shi et al.

(10) Patent No.: US 11,350,378 B2
(45) Date of Patent: May 31, 2022

(54) SIGNAL TRANSMISSION METHOD AND APPARATUS

(71) Applicant: Huawei Technologies Co., Ltd., Shenzhen (CN)

(72) Inventors: Hongzhe Shi, Shanghai (CN); Jin Liu, Shenzhen (CN); Jun Luo, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 16/673,567

(22) Filed: Nov. 4, 2019

(65) Prior Publication Data

US 2020/0068517 A1 Feb. 27, 2020

Related U.S. Application Data

(63) Continuation of application No. PCT/CN2018/085147, filed on Apr. 28, 2018.

(30) Foreign Application Priority Data

May 4, 2017 (CN) .......................... 201710309325.1

(51) Int. Cl.
*H04L 12/28* (2006.01)
*H04W 56/00* (2009.01)
(Continued)

(52) U.S. Cl.
CPC ....... *H04W 56/0015* (2013.01); *H04L 1/0061* (2013.01); *H04L 27/2607* (2013.01); *H04W 72/0466* (2013.01)

(58) Field of Classification Search
CPC ..... H04W 92/10; H04W 92/18; H04W 88/04; H04W 72/121
See application file for complete search history.

(56) References Cited

U.S. PATENT DOCUMENTS

2013/0242770 A1\* 9/2013 Chen ................. H04W 72/1273
370/252
2018/0159713 A1 6/2018 Li et al.
(Continued)

FOREIGN PATENT DOCUMENTS

CN 101507223 A 8/2009
CN 103379079 A 10/2013
(Continued)

OTHER PUBLICATIONS

3GPP TSG RAN WG1 Meeting #88bis R1-1705052, Huawei, HiSilicon:"Discussion on SS burst set composition and SS block time index indication", Spokane, USA, Apr. 3-7, 2017, 9 pages.
3GPP TSG RAN WG1 Meeting #88bis R1-1705705, NTT DOCOMO, INC.:"Discussion on SS block composition, SS burst set composition and SS block index indication for NR", Spokane, USA, Apr. 3-7, 2017, 8 pages.
(Continued)

*Primary Examiner* — Bo Hui A Zhu
(74) *Attorney, Agent, or Firm* — Slater Matsil, LLP

(57) ABSTRACT

This application provides a signal transmission method and apparatus. The method includes: generating a synchronization signal block, where the synchronization signal block includes a synchronization signal and a broadcast signal, a sequence number of the synchronization signal block is indicated by using at least one of sequence number indication information carried in the broadcast signal, a scrambling code of the broadcast signal, a cyclic redundancy check CRC mask of the broadcast signal, a bijective transformation parameter of the broadcast signal, cyclic shift information of the broadcast signal on which channel coding has been performed, and a system frame number carried in the broadcast signal, and the sequence number indicates a location of the synchronization signal block in a plurality of synchronization signal blocks; and sending the synchronization signal block.

13 Claims, 8 Drawing Sheets

(51) Int. Cl.
*H04L 1/00* (2006.01)
*H04L 27/26* (2006.01)
*H04W 72/04* (2009.01)

(56) References Cited

U.S. PATENT DOCUMENTS

| | | |
|---|---|---|
| 2018/0219596 A1 | 8/2018 | He et al. |
| 2018/0220388 A1 | 8/2018 | Chae et al. |
| 2019/0166613 A1* | 5/2019 | Zhang ............... H04W 72/1278 |
| 2019/0261297 A1 | 8/2019 | Li et al. |
| 2019/0320361 A1* | 10/2019 | Uchiyama ............. H04W 36/03 |

FOREIGN PATENT DOCUMENTS

| | | |
|---|---|---|
| CN | 106455040 A | 2/2017 |
| CN | 106507439 A | 3/2017 |
| JP | 2020511053 A | 4/2020 |
| JP | 2020515196 A | 5/2020 |
| JP | 2020519198 A | 6/2020 |
| WO | 2017007285 A1 | 1/2017 |
| WO | 2017054207 A1 | 4/2017 |
| WO | 2018198343 A1 | 11/2018 |

OTHER PUBLICATIONS

3GPP TSG RAN WG1 Meeting #88 R1-1703353, Huawei, HiSilicon, "Discussion on SS burst set composition and SS block time index indication", Athens, Greece, Feb. 13-17, 2017, 7 pages.

3GPP TSG RAN WG1 NR Ad Hoc Meeting R1-1700033, Huawei, HiSilicon, "Discussion and evaluation on NR-SS multiplexing and bandwidth", Spokane, USA, Jan. 16-20, 2017, 12 pages.

Sequans Communications, "Discussion on SS time index indication", 3GPP TSG-RAN WG1 #88 bis, R1-1704599, Apr. 3-7, 2017, 10 pages, Spokane, USA.

Qualcomm Incorporated, "SS block, burst-set composition, and time index indication", 3GPP TSG-RAN WG1 NR #88bis, R1-1705565, Apr. 3-7, 2017, 9 pages, Spokane, USA.

NTT DoCoMo, Inc., "Discussion and evaluation on NR-PBCH design", 3GPP TSG RAN WG1 Meeting #88bis, R1-1705708, Apr. 3-7, 2017, 7 pages, Spokane, USA.

Samsung, "SS block composition, SS burst set composition and SS time index indication", 3GPP TSG RAN WG1 #88bis, R1-1705318, Apr. 3-7, 2017, 12 pages, Spokane, USA.

Huawei et al., "Channel Coding for PBCH", 3GPP TSG RAN WG1 Meeting #88bis, R1-1704249, Apr. 3-7, 2017, 6 pages, Spokane USA.

* cited by examiner

SIGNAL TRANSMISSION METHOD AND APPARATUS

CROSS-REFERENCE TO RELATED APPLICATIONS

This application is a continuation of International Patent Application No. PCT/CN2018/085147, filed on Apr. 28, 2018, which claims priority to Chinese Patent Application No. 201710309325.1, filed on May 4, 2017. The disclosures of the aforementioned applications are hereby incorporated by reference in their entireties.

TECHNICAL FIELD

This application relates to the communications field, and more specifically, to a signal transmission method and apparatus.

BACKGROUND

In long term evolution (LTE), one of basic functions of a synchronization signal (SS) is to indicate a start location of a radio resource frame. A primary synchronization signal (PSS) is sent every 5 ms. There is a fixed time difference between a secondary synchronization signal (SSS) and a primary synchronization signal. In a same radio frame, adjacent secondary synchronization signals are different. Therefore, a time window of 5 ms is obtained by detecting a PSS, and a start location of a radio frame is obtained by detecting an SSS.

In a 5G new radio (NR) access system, a synchronization signal and a broadcast signal jointly form a synchronization signal block (SS block). To be specific, an NR primary synchronization signal (NR-PSS), an NR secondary synchronization signal (NR-SSS), and an NR physical broadcast channel (NR-PBCH) are sent in one SS block. One or more SS blocks form one synchronization signal burst (SS burst). One or more SS bursts form one synchronization signal burst set (SS burst set). An SS burst set is sent periodically.

In an NR high frequency scenario, beamforming is used against a path loss, and therefore a synchronization signal and a broadcast signal are also sent by using a plurality of beams in a polling manner. When a terminal device performs access by using a beam, the terminal device needs to obtain at least one complete synchronization signal and key system information. The at least one complete signal belongs to one SS block. Because there may be a plurality of SS blocks in one SS burst set period, the system further needs to indicate a location of the SS block in the plurality of SS blocks. Therefore, how to effectively indicate a location of a synchronization signal block becomes an urgent technical problem to be resolved in an NR system.

SUMMARY

This application provides a signal transmission method and apparatus, to effectively indicate a location of a synchronization signal block.

According to a first aspect, a signal transmission method is provided. The method includes: generating a synchronization signal block, where the synchronization signal block includes a synchronization signal and a broadcast signal, a sequence number of the synchronization signal block is indicated by using at least one of sequence number indication information carried in the broadcast signal, a scrambling code of the broadcast signal, a cyclic redundancy check CRC mask of the broadcast signal, a bijective transformation parameter of the broadcast signal, cyclic shift information of the broadcast signal on which channel coding has been performed, and a system frame number carried in the broadcast signal, and the sequence number indicates a location of the synchronization signal block in a plurality of synchronization signal blocks; and sending the synchronization signal block.

In the technical solution in this embodiment of this application, the sequence number of the synchronization signal block is indicated by using at least one of the sequence number indication information carried in the broadcast signal, the scrambling code of the broadcast signal, the CRC mask of the broadcast signal, the bijective transformation parameter of the broadcast signal, the cyclic shift information of the broadcast signal on which channel coding has been performed, and the system frame number carried in the broadcast signal, so that the location of the synchronization signal block can be effectively indicated.

In some possible implementations, the sequence number of the synchronization signal block is jointly indicated by using two of the sequence number indication information, the scrambling code, the CRC mask, the bijective transformation parameter, the cyclic shift information, and the system frame number.

In some possible implementations, the sequence number indicates a location of the synchronization signal block in a synchronization signal burst or a synchronization signal burst set.

In some possible implementations, the sequence number may indicate a location of the synchronization signal block in a plurality of synchronization signal blocks that are sent in one period. The plurality of synchronization signal blocks may be a plurality of synchronization signal blocks in one synchronization signal burst, or may be a plurality of synchronization signal blocks in one synchronization signal burst set.

In some possible implementations, the sequence number may be represented by using a predetermined quantity of bits. Optionally, the predetermined quantity may be 6. To be specific, six bits may be used to represent the sequence number. Six bits may indicate a maximum of 64 synchronization signal blocks. Optionally, when a quantity of the plurality of synchronization signal blocks is less than 64, one or more most significant bits (MSBs) in a binary bit form of the sequence number may not be used. For example, if the quantity of synchronization signal blocks is 8, only three least significant bits need to be used.

In some possible implementations, in two scenarios with different quantities of synchronization signal blocks, for example, in a high frequency scenario and a low frequency scenario, the sequence number may alternatively be represented by using different quantities of bits.

In some possible implementations, the sequence number may be implicitly indicated by using one of the scrambling code, the CRC mask, the bijective transformation parameter, the cyclic shift information, and the system frame number.

In some possible implementations, the sequence number includes two pails, and one part of the sequence number is indicated by using the sequence number indication information; and the other part of the sequence number is indicated by using one of the scrambling code, the CRC mask, the bijective transformation parameter, the cyclic shift information, and the system frame number.

The sequence number of the synchronization signal block is indicated in a combined explicit and implicit manner. In this way, fewer information bits in the broadcast signal may be used to carry the sequence number indication information, thereby saving a broadcast signal resource and improving indication efficiency.

In some possible implementations, one or more most significant bits in a binary bit form of the sequence number is indicated by using the scrambling code; and one or more least significant bits (LSBs) in the binary bit form of the sequence number is indicated by using the sequence number indication information.

In some possible implementations, one or more most significant bits in a binary bit form of the sequence number is indicated by using the cyclic shift information; and one or more least significant bits in the binary bit form of the sequence number is indicated by using the sequence number indication information.

In some possible implementations, one or more most significant bits in a binary bit form of the sequence number is indicated by using the sequence number indication information; and one or more least significant bits in the binary bit form of the sequence number is indicated by using the bijective transformation parameter.

Broadcast signals in a plurality of synchronization signal blocks that carry same sequence number indication information have same content, and therefore the plurality of synchronization signal blocks can be coherently combined.

In some possible implementations, one or more most significant bits in a binary bit form of the sequence number is indicated by using the system frame number; and one or more least significant bits in the binary bit form of the sequence number is indicated by using the sequence number indication information.

In some possible implementations, the sequence number includes two parts, and the two parts of the sequence number are respectively indicated by using two of the scrambling code, the CRC mask, the bijective transformation parameter, and the cyclic shift information.

Both parts of the sequence number of the synchronization signal block are implicitly indicated. In this way, a broadcast signal resource can be further saved. In addition, the sequence number of the synchronization signal block is not explicitly indicated by using the broadcast signal, broadcast signals in a plurality of synchronization signal blocks have same content, and thus the plurality of synchronization signal blocks can be coherently combined.

In some possible implementations, one or more most significant bits in a binary bit form of the sequence number is indicated by using the CRC mask; and one or more least significant bits in the binary bit form of the sequence number is indicated by using the scrambling code.

According to a second aspect, a signal transmission method is provided. The method includes: detecting a synchronization signal block, where the synchronization signal block includes a synchronization signal and a broadcast signal; and determining a sequence number of the synchronization signal block based on at least one of sequence number indication information carried in the broadcast signal, a scrambling code of the broadcast signal, a cyclic redundancy check CRC mask of the broadcast signal, a bijective transformation parameter of the broadcast signal, cyclic shift information of the broadcast signal on which channel coding has been performed, and a system frame number carried in the broadcast signal, and the sequence number indicates a location of the synchronization signal block in a plurality of synchronization signal blocks.

In this embodiment of this application, the sequence number of the synchronization signal block is indicated by using at least one of the sequence number indication information carried in the broadcast signal, the scrambling code of the broadcast signal, the CRC mask of the broadcast signal, the bijective transformation parameter of the broadcast signal, the cyclic shift information of the broadcast signal on which channel coding has been performed, and the system frame number carried in the broadcast signal, so that the location of the synchronization signal block can be effectively indicated.

In some possible implementations, the determining a sequence number of the synchronization signal block includes: determining the sequence number based on two of the sequence number indication information, the scrambling code, the CRC mask, the bijective transformation parameter, the cyclic shift information, and the system frame number.

In some possible implementations, the sequence number indicates a location of the synchronization signal block in a synchronization signal burst or a synchronization signal burst set.

In some possible implementations, the sequence number includes two pails, and the determining a sequence number of the synchronization signal block includes: determining one part of the sequence number based on the sequence number indication information; and determining the other part of the sequence number based on one of the scrambling code, the CRC mask, the bijective transformation parameter, the cyclic shift information, and the system frame number.

In some possible implementations, the determining a sequence number of the synchronization signal block includes: determining one or more most significant bits in a binary bit form of the sequence number based on the scrambling code; and determining one or more least significant bits in the binary bit form of the sequence number based on the sequence number indication information.

In some possible implementations, the determining a sequence number of the synchronization signal block includes: determining one or more most significant bits in a binary bit form of the sequence number based on the cyclic shift information; and determining one or more least significant bits in the binary bit form of the sequence number based on the sequence number indication information.

In some possible implementations, the determining a sequence number of the synchronization signal block includes: determining one or more most significant bits in a binary bit form of the sequence number based on the sequence number indication information; and determining one or more least significant bits in the binary bit form of the sequence number based on the bijective transformation parameter.

In some possible implementations, the determining a sequence number of the synchronization signal block includes: determining one or more most significant bits in a binary bit form of the sequence number based on the system frame number; and determining one or more least significant bits in the binary bit form of the sequence number based on the sequence number indication information.

In some possible implementations, the sequence number includes two pails, and the determining a sequence number of the synchronization signal block includes: determining the two parts of the sequence number respectively based on two of the scrambling code, the CRC mask, the bijective transformation parameter, and the cyclic shift information.

In some possible implementations, the determining a sequence number of the synchronization signal block includes: determining the one or more most significant bits in the binary bit form of the sequence number based on the CRC mask; and determining the one or more least significant bits in the binary bit form of the sequence number based on the scrambling code.

According to a third aspect, a signal transmission apparatus is provided. The apparatus includes a processor and a transceiver, and can perform the method according to any one of the first aspect or the possible implementations of the first aspect.

According to a fourth aspect, a signal transmission apparatus is provided. The apparatus includes a processor and a transceiver, and can perform the method according to any one of the second aspect or the possible implementations of the second aspect.

According to a fifth aspect, a computer storage medium is provided. The computer storage medium stores program code, and the program code can be used to instruct to perform the method according to any one of the first aspect or the possible implementations of the first aspect, or the method according to any one of the second aspect or the possible implementations of the second aspect.

According to a sixth aspect, a computer program product including an instruction is provided. When the computer program product is run on a computer, the computer is enabled to perform the method according to any one of the first aspect or the possible implementations of the first aspect, or the method according to any one of the second aspect or the possible implementations of the second aspect.

DETAILED DESCRIPTION OF ILLUSTRATIVE EMBODIMENTS

The following describes technical solutions of this application with reference to the accompanying drawings.

Figure 1:
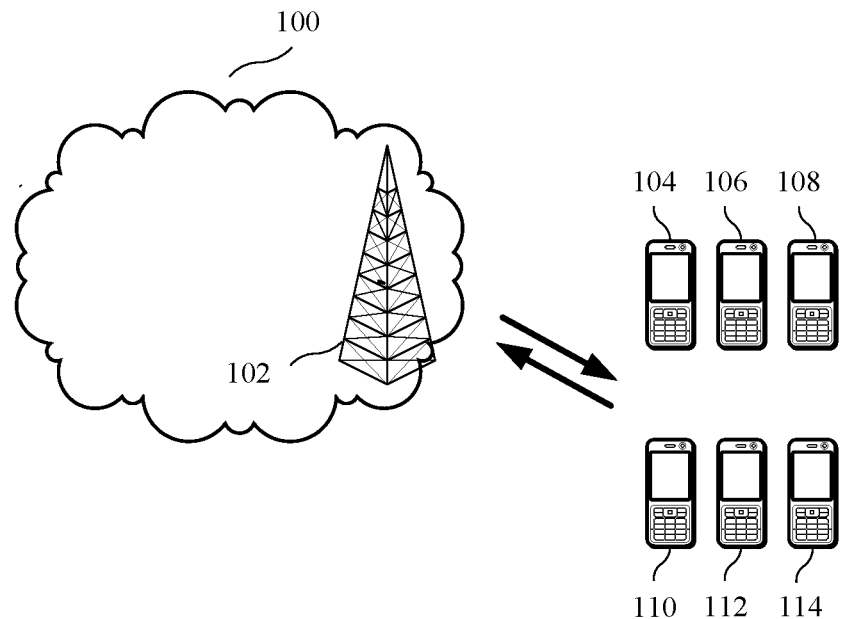
FIG. 1 is a schematic diagram of a system applied to an embodiment of this application.

FIG. 1 is a schematic diagram of a system applied to an embodiment of this application. As shown in FIG. 1, a system 100 may include a network device 102 and terminal devices 104, 106, 108, 110, 112, and 114. The network device and the terminal devices are wirelessly connected. It should be understood that FIG. 1 is described by using an example in which the system includes only one network device. However, this embodiment of this application is not limited thereto. For example, the system may alternatively include more network devices. Similarly, the system may alternatively include more terminal devices. It should be further understood that the system may also be referred to as a network. This is not limited in this embodiment of this application.

This specification describes the embodiments with reference to a terminal device. The terminal device may be user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN), or the like.

By way of example but not limitation, in the embodiments of this application, the terminal device may also be a wearable device. The wearable device may also be referred to as a wearable smart device, and is a general term for devices such as glasses, gloves, watches, clothing, or shoes that can be worn and that are developed by intelligently designing everyday wearing by applying a wearable technology. The wearable device is a portable device that is directly worn on the body or that is integrated into user's clothing or accessories. The wearable device is more than a hardware device, and implements powerful functions through software support, data exchange, and cloud interaction. General wearable smart devices include a full-functioned and large-size device that can implement all or some functions without a smartphone, such as a smartwatch or smart glasses; and a device that focuses on only one specific type of application function and needs to be used together with another device such as a smartphone, such as various smart bands for vital sign monitoring or smart jewelry.

This specification describes the embodiments with reference to a network device. The network device may be a device for communicating with a terminal device. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in a long term evolution (LTE) system, or may be a radio controller in a cloud radio access network (CRAN) scenario; or the network device may be a relay station, an access point, an in-vehicle device, a wearable device, a network device in a future 5G network, a network device in a future evolved PLMN network, or the like.

In addition, in the embodiments of this application, the network device provides a service for a cell. The terminal device communicates with the network device by using a transmission resource (for example, a frequency domain resource or a spectrum resource) used in the cell. The cell may be a cell corresponding to the network device (for example, a base station). The cell may belong to a macro base station, or a base station corresponding to a small cell (small cell). The small cell herein may include a metro cell, a micro cell, a pico cell, a femto cell, or the like. The small cells have features such as small coverage and low transmit power, and are applicable to providing high-rate data transmission services. In addition, the cell may be a hyper cell.

In a hyper cell network architecture, a network device may be divided into one centralized unit (CU) and a plurality of transmission reception points (TRP)/distributed units (DU). In other words, a bandwidth based unit (BBU) of the network device is reconstructed as a DU functional entity and a CU functional entity. It should be noted that forms and quantities of centralized units and TRPs/DUs do not constitute a limitation on the embodiments of this application.

A CU processes a radio upper-layer protocol stack function, for example, a radio resource control (RRC) layer and a packet data convergence protocol (PDCP) layer, and can even support some core network functions in an access network. The access network supporting some core network functions is termed an edge computing network. The access network can meet a higher network latency requirement on a future communications network for an emerging service such as video, online shopping, and virtual/augmented reality.

A DU mainly processes a physical layer function and a layer 2 function with a higher real-time requirement. Considering transmission resources of a radio remote unit (RRU) and the DU, some physical layer functions of the DU may be deployed on the RRU. With miniaturization of the RRU, more radically, the DU may be combined with the RRU.

CUs can be arranged together. A layout of DUs depends on an actual network environment. In an area with high traffic density, a small inter-site distance, and limited equipment room resources, for example, a core urban area, a university, and a large-scale performance venue, DUs may also be arranged in a centralized manner. However, in an area with low traffic density and a large inter-site distance, for example, a suburb and a mountainous area, DUs may be arranged in a distributed manner.

Figure 2:
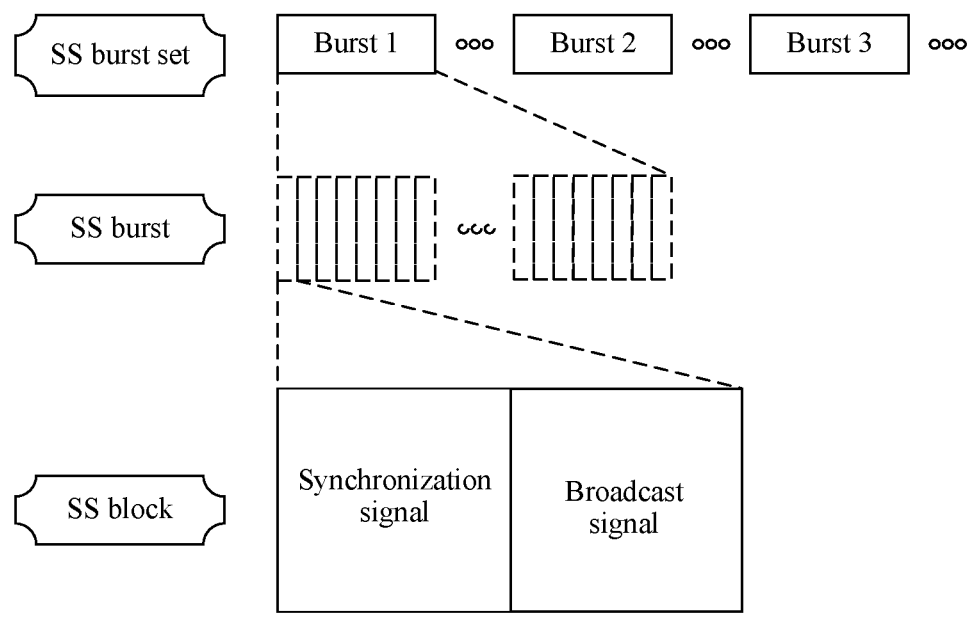
FIG. 2 is a schematic diagram of a resource structure of a synchronization and broadcast channel in an NR system.

FIG. 2 is a schematic diagram of an example of a resource structure of a synchronization and broadcast channel in an NR system. As shown in FIG. 2, in the NR system, a synchronization signal and a broadcast signal jointly form one SS block, one or more SS blocks form one SS burst, and one or more SS bursts form one SS burst set. There may be a plurality of SS blocks in one transmission period, such as an SS burst set period. A terminal device cannot determine, only by detecting the synchronization signal, a location of the detected SS block in the plurality of SS blocks. To be specific, the terminal device cannot determine a time index of the detected SS block, which may be referred to as a sequence number of the synchronization signal block for ease of description. Consequently, time synchronization cannot be implemented and a radio frame structure cannot be determined.

An embodiment of this application provides a signal transmission solution suitable for NR, to effectively indicate a location of a synchronization signal block. The following describes in detail the technical solutions in the embodiments of this application.

Figure 3:
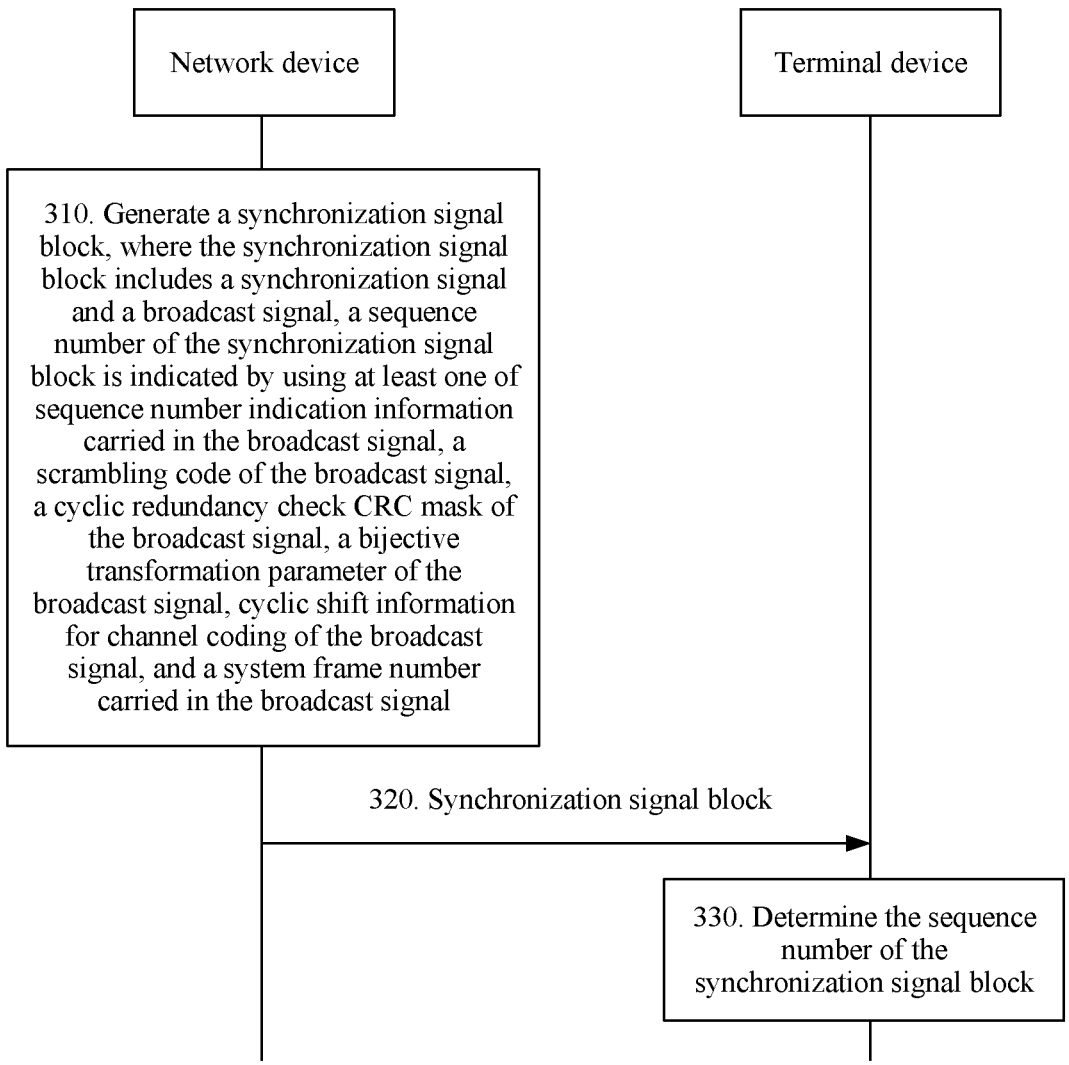
FIG. 3 is a schematic flowchart of a signal transmission method according to an embodiment of this application.

FIG. 3 is a schematic flowchart of a signal transmission method according to an embodiment of this application. A network device in FIG. 3 may be the network device 102 in FIG. 1. A terminal device may be a terminal device in the terminal devices 104, 106, 108, 110, 112, and 114 in FIG. 1. Certainly, in an actual system, quantities of network devices and terminal devices may not be limited to examples in this embodiment or another embodiment. Details are not described below again.

310. The network device generates a synchronization signal block, where the synchronization signal block may include a synchronization signal and a broadcast signal, a sequence number of the synchronization signal block is indicated by using at least one of sequence number indication information carried in the broadcast signal, a scrambling code of the broadcast signal, a cyclic redundancy check CRC mask of the broadcast signal, a bijective transformation parameter of the broadcast signal, cyclic shift information of the broadcast signal on which channel coding has been performed, and a system frame number carried in the broadcast signal, and the sequence number of the synchronization signal block indicates a location of the synchronization signal block in a plurality of synchronization signal blocks.

In this embodiment of this application, the synchronization signal included in the synchronization signal block may include a primary synchronization signal (NR-PSS or PSS for short, for ease of description) and a secondary synchronization signal (NR-SSS or SSS for short, for ease of description), and the synchronization signal may be used to implement a main synchronization function. In addition, an example of this embodiment of this application provides a manner of indicating the sequence number of the synchronization signal block. To be specific, the sequence number of the synchronization signal block is indicated by using at least one of the sequence number indication information carried in the broadcast signal included in the synchronization signal block, the scrambling code of the broadcast signal, the cyclic redundancy check (CRC) mask of the broadcast signal, the bijective transformation parameter of the broadcast signal, the cyclic shift information of the broadcast signal on which channel coding has been performed, and the system frame number carried in the broadcast signal.

In this embodiment of this application, the sequence number of the synchronization signal block indicates the location of the synchronization signal block in the plurality of synchronization signal blocks, and the sequence number may also be referred to as a time index.

Optionally, in an embodiment of this application, the sequence number of the synchronization signal block may indicate a location of the synchronization signal block in a synchronization signal burst or a synchronization signal burst set.

Specifically, the sequence number of the synchronization signal block may indicate a location of the synchronization signal block in a plurality of synchronization signal blocks that are sent in one period. The plurality of synchronization signal blocks may be a plurality of synchronization signal blocks in one synchronization signal burst, or may be a plurality of synchronization signal blocks in one synchronization signal burst set.

Optionally, a quantity of the plurality of synchronization signal blocks may be related to a quantity of beams used for beamforming. To be specific, when there is a relatively large quantity of beams, there is a relatively large quantity of the plurality of synchronization signal blocks. When there is a relatively small quantity of beams, there is a relatively small quantity of the plurality of synchronization signal blocks. In an example, for a high frequency scenario, a quantity of the plurality of synchronization signal blocks may be 64. For a low frequency scenario, a quantity of the plurality of synchronization signal blocks may be 8 or 4. However, this is not limited in this embodiment of this application.

Optionally, the sequence number may be represented by using a predetermined quantity of bits. In two scenarios with different quantities of synchronization signal blocks, for example, in the high frequency scenario and the low frequency scenario, the sequence number may be represented by using a same quantity of bits. The predetermined quantity of bits is not limited in this embodiment of this application. In an example, the predetermined quantity of bits may be 6. To be specific, six bits may be used to represent the sequence number. Six bits may indicate a maximum of 64 synchronization signal blocks. Optionally, when the quantity of the plurality of synchronization signal blocks is less than 64, one or more most significant bits in a binary bit form of the sequence number may not be used. For example, in the low frequency scenario, if the quantity of synchronization signal blocks is 8, only three least significant bits need to be used.

It should be understood that, in two scenarios with different quantities of synchronization signal blocks, for example, in the high frequency scenario and the low frequency scenario, the sequence number may alternatively be represented by using different quantities of bits. This is not limited in this embodiment of this application.

In this embodiment of this application, the sequence number of the synchronization signal block is indicated by using at least one of the sequence number indication information carried in the broadcast signal, the scrambling code of the broadcast signal, the CRC mask of the broadcast signal, the bijective transformation parameter of the broadcast signal, the cyclic shift information of the broadcast signal on which channel coding has been performed, and the system frame number carried in the broadcast signal. A manner in which the broadcast signal carries the sequence number indication information may be an explicit indication manner, and another indication manner may be an implicit indication manner.

The broadcast signal in the synchronization signal block may carry main system information, for example, a master information block (MIB). In this embodiment of this application, the broadcast signal may be used to carry the sequence number indication information, where the sequence number indication information is used to indicate the sequence number of the synchronization signal block, and the sequence number indication information may be specifically used to explicitly indicate the sequence number of the synchronization signal block.

The broadcast signal may use different scrambling codes to indicate sequence numbers of different synchronization signal blocks. For example, four scrambling codes may be used to respectively indicate four sequence numbers. Similarly, different CRC masks, different bijective transformation parameters, different cyclic shift information, or different system frame numbers may be used to indicate sequence numbers of different synchronization signal blocks. Specifically, an implicit indication may be used, and learning of the different scrambling codes, the different CRC masks, the different bijective transformation parameters, the different cyclic shift information, or the different system frame numbers means learning of the sequence numbers of the synchronization signal blocks. Specific implementation may be that the sequence numbers of the synchronization signal blocks may be indicated based on correspondences between the sequence numbers of the different synchronization signal blocks and the different scrambling codes, the different CRC masks, the different bijective transformation parameters, the different cyclic shift information, or the different system frame numbers. The correspondence may be expressed in a form of a formula, a table, or the like.

Optionally, in an embodiment of this application, the sequence number of the synchronization signal block may be indicated by using one of the sequence number indication information, the scrambling code, the CRC mask, the bijective transformation parameter, the cyclic shift information, and the system frame number. For example, when the quantity of synchronization signal blocks is relatively small, only one of the foregoing indications may be used. In an embodiment of this application, the sequence number may be implicitly indicated by using one of the scrambling code, the CRC mask, the bijective transformation parameter, the cyclic shift information, and the system frame number. For example, if the quantity of synchronization signal blocks is 4, four scrambling codes may be used to respectively indicate sequence numbers of four synchronization signal blocks.

Optionally, in an embodiment of this application, the sequence number may be jointly indicated by using two of the sequence number indication information, the scrambling code, the CRC mask, the bijective transformation parameter, the cyclic shift information, and the system frame number. To be specific, the sequence number may be divided into two parts, one part is indicated by using one of the foregoing items, and the other part is indicated by using another of the foregoing items.

Optionally, in an embodiment of this application, the one part of the sequence number is indicated by using the sequence number indication information; and the other part of the sequence number is indicated by using one of the scrambling code, the CRC mask, the bijective transformation parameter, the cyclic shift information, and the system frame number.

It may be understood that, in this embodiment of this application, the sequence number of the synchronization signal block is indicated in a combined explicit and implicit manner. In this way, fewer information bits in the broadcast signal may be used to carry the sequence number indication information, thereby saving a broadcast signal resource and improving indication efficiency.

Optionally, in an embodiment of this application, one or more most significant bits in a binary bit form of the sequence number is indicated by using the scrambling code. Certainly, one or more most significant bits and one or more least significant bits in the embodiments of this application may also be in another form, for example, in an octal form, a decimal form, or a hexadecimal form, which falls within the scope of the embodiments of this application. This embodiment of this application is described by using the binary bit form as an example, but is not limited to the binary bit form.

One or more least significant bits in the binary bit form of the sequence number is indicated by using the sequence number indication information.

Specifically, in this embodiment, the sequence number of the synchronization signal block is indicated in a manner that combines a broadcast signal indication and a scrambling code indication. The one or more least significant bits in the binary bit form of the sequence number is carried in the broadcast signal, and the one or more most significant bits in the binary bit form of the sequence number is indicated by using different scrambling codes.

Figure 4:
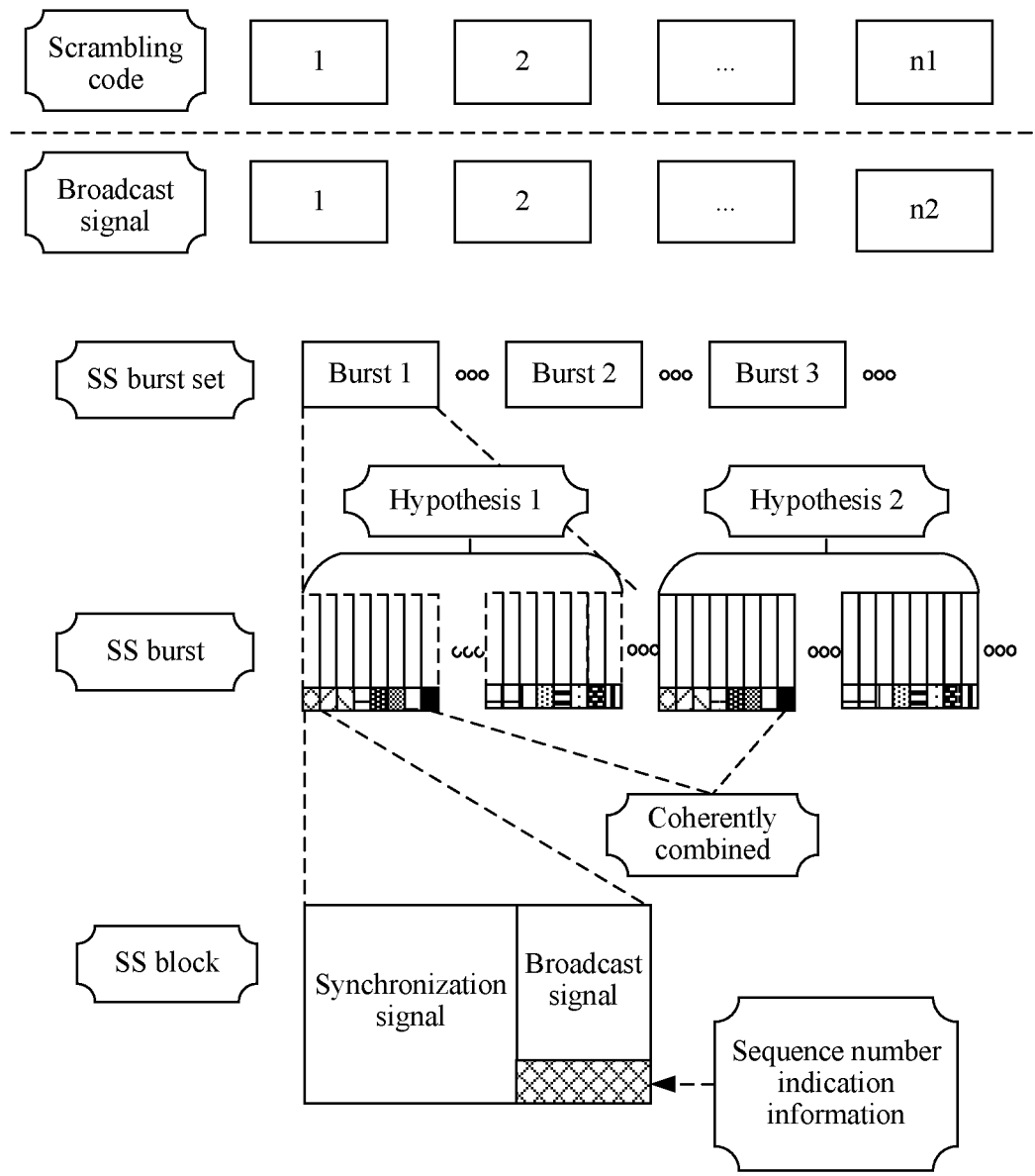
FIG. 4 is a schematic diagram of a manner of indicating a sequence number of a synchronization signal block according to an embodiment of this application.

As shown in FIG. 4, the broadcast signal in the synchronization signal block carries the sequence number indication information, and an information bit of the sequence number indication information may be the one or more least significant bits in the binary bit form of the sequence number of the synchronization signal block. In addition, the one or more most significant bits in the binary bit form of the sequence number is indicated by using different scrambling codes.

For example, it is assumed that the quantity of synchronization signal blocks is 64, and the sequence number of the synchronization signal block may be represented by using six bits. There may be two significant bits, and four values of the significant bits may be represented by using four scrambling codes. To be specific, four scrambling code hypotheses are corresponding to a total of four values of the two bits. $n_1$ in FIG. 4 is 4. There may be four least bits, and 16 values of the least bits are directly carried in the broadcast signal. $n_2$ is 16 in FIG. 4.

It should be understood that, in various embodiments of this application, quantities of bits in the two pails indicated by the sequence number of the synchronization signal block may be interchanged, for example, four bits are used as significant bits, and two bits are used as least bits. The interchange should also be used as an embodiment of this application. Details are not described below again.

Correspondingly, when detecting the synchronization signal block, the terminal device performs blind detection by using the four hypotheses of the scrambling code of the broadcast signal. After the detection succeeds, a value of a significant bit of a sequence number corresponding to the corresponding hypothesis can be determined. Then, a value of a least bit of the sequence number is determined by using the sequence number indication information carried in the broadcast signal, to determine the sequence number of the detected synchronization signal block.

Broadcast signals in a plurality of synchronization signal blocks in one hypothesis carry different sequence number indication information. Therefore, the broadcast signals have different content and the plurality of synchronization signal blocks cannot be coherently combined. Broadcast signals in corresponding synchronization signal blocks under different hypotheses carry same sequence number indication information. Therefore, the corresponding broadcast signals have same content, and the synchronization signal blocks can be coherently combined.

It should be understood that the scrambling code indication manner in the foregoing embodiment may be changed to another indication manner, for example, the CRC mask indication manner, the bijective transformation parameter indication manner, the cyclic shift information indication manner, or the system frame number indication manner. Alternatively, it may be understood that the scrambling code implicit indication manner in the foregoing embodiment may be changed to another implicit indication manner. For brevity, details are not described herein.

It should be understood that, in various embodiments of this application, the one or more most significant bits and the one or more least significant bits in the sequence number of the synchronization signal block may also respectively be a first-level sequence number and a second-level sequence number of the sequence number of the synchronization signal block. For example, in the foregoing embodiment, the first-level sequence number may be 2 bits, may be indicated by using the scrambling code, and may be understood as an implicit indication. The second-level sequence number may be 4 bits, may be indicated by using the sequence number indication information carried in the broadcast signal, and may be understood as an explicit indication. For brevity, details are not described herein.

Optionally, in an embodiment of this application, one or more most significant bits in a binary bit form of the sequence number is indicated by using the cyclic shift information of the broadcast signal on which channel coding has been performed; and one or more least significant bits in the binary bit form of the sequence number is indicated by using the sequence number indication information.

A broadcast channel may be coded by using a polar code in NR, and one cyclic buffer (an English name may be but is not limited to circle buffer) may be obtained through the coding performed by using the polar code. The cyclic buffer may provide a plurality of different cyclic shift combinations, and each combination (e.g., cyclic shift information) may indicate one case.

In this embodiment, the sequence number of the synchronization signal block is indicated in a manner that combines an indication of the sequence number indication information carried in the broadcast signal and an indication of the cyclic shift information. The one or more least significant bits in the binary bit form of the sequence number is carried in the broadcast signal, and the one or more most significant bits in the binary bit form of the sequence number is indicated by different cyclic shift information.

Figure 5:
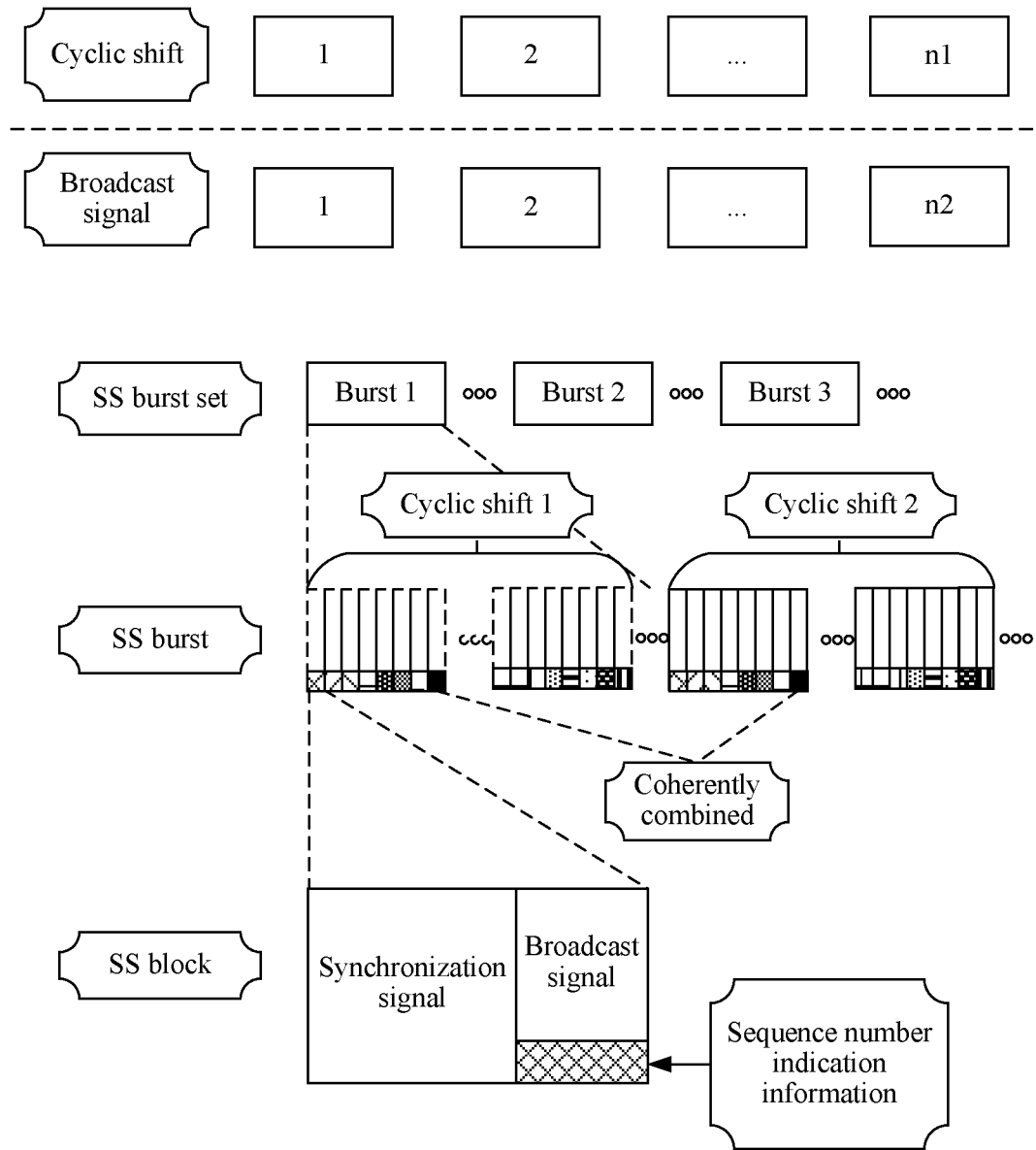
FIG. 5 is a schematic diagram of a manner of indicating a sequence number of a synchronization signal block according to another embodiment of this application.

As shown in FIG. 5, the broadcast signal in the synchronization signal block carries the sequence number indication information, and an information bit of the sequence number indication information may be the one or more least significant bits in the binary bit form of the sequence number of the synchronization signal block. In addition, the one or more most significant bits in the binary bit form of the sequence number is implicitly indicated by using different cyclic shift information.

For example, it is assumed that the quantity of synchronization signal blocks is 64, and the sequence number of the synchronization signal block may be represented by using six bits. There may be two significant bits (or the first-level sequence number may have two bits), and four values of the two significant bits may be respectively represented by using four cyclic shifts of the broadcast signal on which channel coding has been performed. To be specific, the four cyclic shifts are corresponding to a total of the four values of the two bits. $n_1$ is 4 in FIG. 5. There may be four least bits (or the second-level sequence number may have four bits), and 16 values of the four least bits (or the second-level sequence number) are directly carried in the broadcast signal. $n_2$ is 16 in FIG. 5.

Broadcast signals in a plurality of synchronization signal blocks corresponding to one cyclic shift carry different sequence number indication information. Therefore, the broadcast signals have different content and the plurality of synchronization signal blocks cannot be coherently combined. Broadcast signals in synchronization signal blocks corresponding to different cyclic shifts carry same sequence number indication information. Therefore, the broadcast signals have same content and the synchronization signal blocks can be coherently combined.

It should be understood that the cyclic shift information indication manner in the foregoing embodiment may be changed to another indication manner. Alternatively, it may be understood that the cyclic shift information implicit indication manner in the foregoing embodiment may be changed to another implicit indication manner. For brevity, details are not described herein.

Optionally, in an embodiment of this application, one or more most significant bits in a binary bit form of the sequence number is indicated by using the sequence number indication information; and one or more least significant bits in the binary bit form of the sequence number is indicated by using the bijective transformation parameter.

Specifically, in this embodiment, the sequence number of the synchronization signal block is indicated in a manner that combines an indication of the sequence number indication information carried in the broadcast signal and an indication of the bijective transformation parameter. The one or more most significant bits in the binary bit form of the sequence number is carried in the broadcast signal, and the one or more least significant bits in the binary bit form of the sequence number is indicated by using different bijective transformation parameters.

The bijective transformation parameter may be a shift manner for coding of the broadcast signal. To be specific, different bijective transformation parameters are corresponding to different shift manners.

Figure 6:
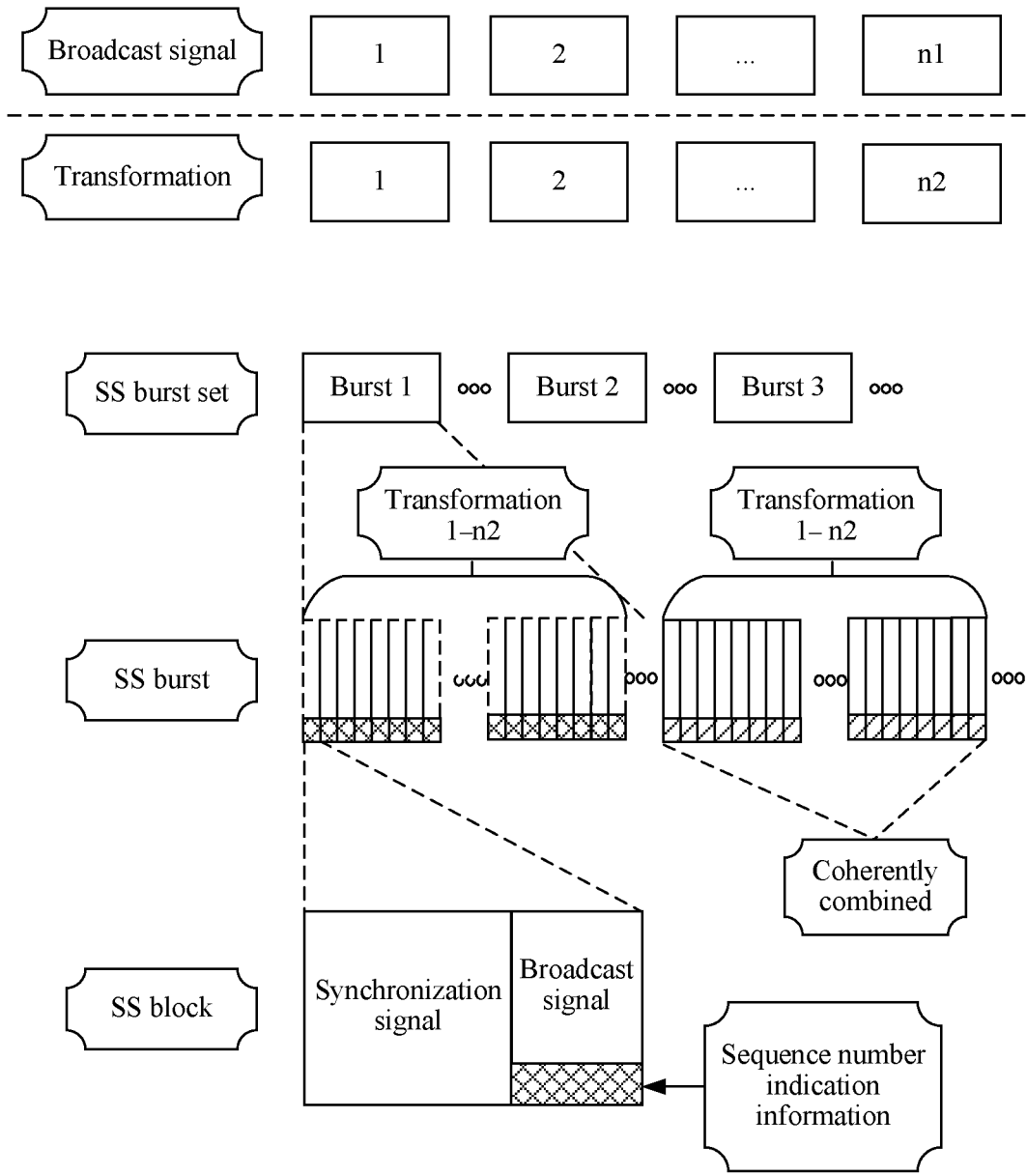
FIG. 6 is a schematic diagram of a manner of indicating a sequence number of a synchronization signal block according to still another embodiment of this application.

As shown in FIG. 6, the broadcast signal in the synchronization signal block carries the sequence number indication information, and an information bit of the sequence number indication information may be the one or more most significant bits in the binary bit form of the sequence number of the synchronization signal block. In addition, the one or more least significant bits in the binary bit form of the sequence number is implicitly indicated by using different bijective transformation parameters.

For example, it is assumed that the quantity of synchronization signal blocks is 32, and the sequence number of the synchronization signal block may be represented by using five bits. There may be two significant bits (or the first-level sequence number may have two bits), and four values of the two significant bits (or the first-level sequence number) may be directly carried by the broadcast signal. $n_1$ is 4 in FIG. 6. There may be three least bits (or the second-level sequence number may have three bits), and eight values of the least bits (or the second-level sequence number) are indicated by using eight bijective transformation parameters. $n_2$ is 8 in FIG. 6.

[(moo] In this embodiment, broadcast signals that are in a plurality of synchronization signal blocks and that carry same sequence number indication information have same content. Therefore, the plurality of synchronization signal blocks can be coherently combined.

It should be understood that the bijective transformation parameter indication manner in the foregoing embodiment may be changed to another indication manner. Alternatively, it may be understood that the bijective transformation parameter implicit indication manner in the foregoing embodiment may be changed to another implicit indication manner. For brevity, details are not described herein.

Optionally, in an embodiment of this application, one or more most significant bits in a binary bit form of the sequence number is indicated by using the system frame number; and one or more least significant bits in the binary bit form of the sequence number is indicated by using the sequence number indication information.

Specifically, when one synchronization signal burst set covers a plurality of system frames, the sequence number of the synchronization signal block may be indicated in a manner that combines an indication of the sequence number indication information carried in the broadcast signal and an indication of the system frame number. The one or more least significant bits in the binary bit form of the sequence number is carried in the broadcast signal, and the one or more most significant bits in the binary bit form of the sequence number is indicated by using different system frame numbers.

Figure 7:
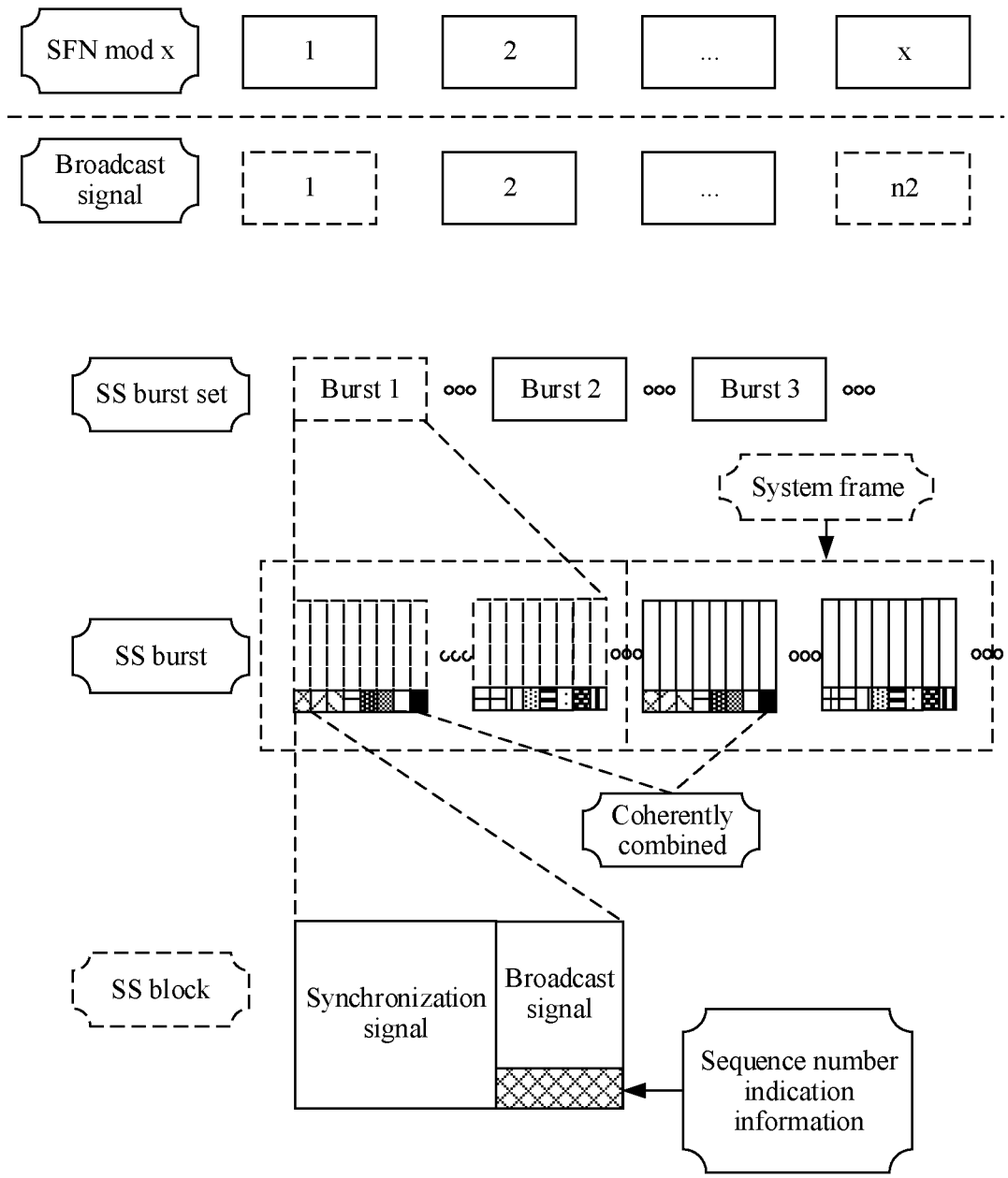
FIG. 7 is a schematic diagram of a manner of indicating a sequence number of a synchronization signal block according to still another embodiment of this application.

As shown in FIG. 7, the broadcast signal in the synchronization signal block carries the sequence number indication information, and an information bit of the sequence number indication information may be the one or more least significant bits in the binary bit form of the sequence number of the synchronization signal block. In addition, the one or more most significant bits in the binary bit form of the sequence number is indicated by using different system frame numbers.

For example, it is assumed that the quantity of synchronization signal blocks is 64, and one system frame includes 16 synchronization signal blocks. Therefore, one synchronization signal burst set covers four system frames. The sequence number of the synchronization signal block may be represented by using six bits. There may be two significant bits (or the first-level sequence number may have two bits), and four values of the two significant bits (or the first-level sequence number) may be represented by using SFN mod 4, where SFN indicates the system frame number. x is 4 in FIG. 7. There may be four least bits (or the second-level sequence number may have four bits), and 16 values of the four least bits (or the second-level sequence number) are directly carried in the broadcast signal. $n_2$ is 16 in FIG. 7.

Broadcast signals in a plurality of synchronization signal blocks in one system frame carry different sequence number indication information. Therefore, the broadcast signals have different content and the plurality of synchronization signal blocks cannot be coherently combined. Broadcast signals in corresponding synchronization signal blocks in different system frames carry same sequence number indication information. Therefore, the corresponding broadcast signals have same content and the synchronization signal blocks can be coherently combined.

Optionally, in another embodiment of this application, the two parts of the sequence number are respectively indicated by using two of the scrambling code, the CRC mask, the bijective transformation parameter, and the cyclic shift information.

Specifically, in this embodiment of this application, both parts of the sequence number of the synchronization signal block are implicitly indicated. In this way, a broadcast signal resource may be further saved.

In addition, because the sequence number of the synchronization signal block is not explicitly indicated by using the broadcast signal, broadcast signals in a plurality of synchronization signal blocks have same content, and the plurality of synchronization signal blocks can be coherently combined.

Optionally, in an embodiment of this application, one or more most significant bits in a binary bit form of the sequence number is indicated by using the CRC mask; and one or more least significant bits in the binary bit form of the sequence number is indicated by using the scrambling code.

Specifically, in this embodiment, the sequence number of the synchronization signal block is indicated in a manner that combines two implicit indications. The one or more most significant bits in the binary bit form of the sequence number is indicated by using different CRC masks, and the one or more least significant bits in the binary bit form of the sequence number is indicated by using different scrambling codes.

Figure 8:
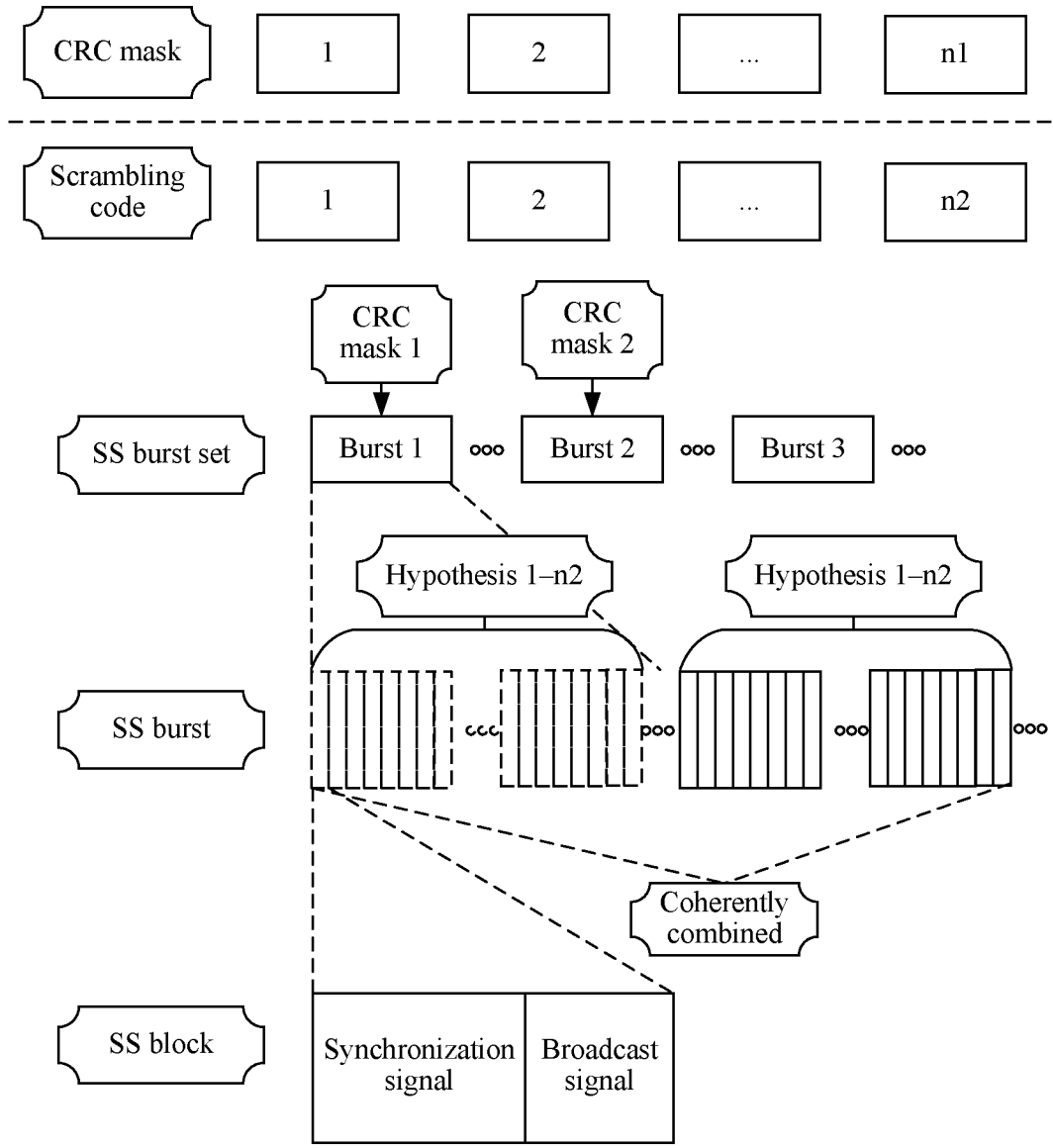
FIG. 8 is a schematic diagram of a manner of indicating a sequence number of a synchronization signal block according to still another embodiment of this application.

As shown in FIG. 8, the broadcast signal in the synchronization signal block carries the sequence number indication information, and an information bit of the sequence number indication information may be the one or more least significant bits in the binary bit form of the sequence number of the synchronization signal block. In addition, the one or more most significant bits in the binary bit form of the sequence number is indicated by using different scrambling codes.

For example, it is assumed that the quantity of synchronization signal blocks is 64, and the sequence number of the synchronization signal block may be represented by using six bits. There may be two significant bits (or the first-level sequence number may have two bits), and four values of the two significant bits (or the first-level sequence number) may be respectively represented by using four CRC masks, that is, the four CRC masks are corresponding to a total of the four values of the two bits. $n_1$ is 4 in FIG. 8. There may be four least bits (or the second-level sequence number may have four bits), and 16 values of the four least bits (or the second-level sequence number) may be represented by using 16 scrambling codes, that is, 16 scrambling code hypotheses are corresponding to a total of the 16 values of the four bits. $n_2$ is 16 in FIG. 8.

It should be understood that the scrambling code implicit indication manner in the foregoing embodiment may also be changed to another implicit indication manner. For brevity, details are not described herein.

320. A network device sends the synchronization signal block.

After generating the foregoing synchronization signal block, the network device sends the synchronization signal block by using a corresponding transmission resource. Correspondingly, the terminal device detects the synchronization signal block, and performs synchronization and access based on the synchronization signal block.

330. The terminal device determines a sequence number of the synchronization signal block based on at least one of the sequence number indication information carried in the broadcast signal, the scrambling code of the broadcast signal, the CRC mask of the broadcast signal, the bijective transformation parameter of the broadcast signal, the cyclic shift information of the broadcast signal on which channel coding has been performed, and the system frame number carried in the broadcast signal.

After detecting the synchronization signal block, the terminal device implements a main synchronization function based on the synchronization signal in the synchronization signal block, and correspondingly determines the sequence number of the synchronization signal block based on at least one of the foregoing items, to complete time synchronization and determine a radio frame structure.

Optionally, in an embodiment of this application, the terminal device determines the sequence number based on two of the sequence number indication information, the scrambling code, the CRC mask, the bijective transformation parameter, the cyclic shift information, and the system frame number.

Optionally, in an embodiment of this application, the terminal device determines one part of the sequence number based on the sequence number indication information, and determines the other part of the sequence number based on one of the scrambling code, the CRC mask, the bijective transformation parameter, the cyclic shift information, and the system frame number.

Optionally, in an embodiment of this application, the terminal device determines one or more most significant bits in a binary bit form of the sequence number based on the scrambling code, and determines one or more least significant bits in the binary bit form of the sequence number based on the sequence number indication information.

Optionally, in an embodiment of this application, the terminal device determines one or more most significant bits in a binary bit form of the sequence number based on the cyclic shift information, and determines one or more least significant bits in the binary bit form of the sequence number based on the sequence number indication information.

Optionally, in an embodiment of this application, the terminal device determines one or more most significant bits in a binary bit form of the sequence number based on the sequence number indication information, and determines one or more least significant bits in the binary bit form of the sequence number based on the bijective transformation parameter.

Optionally, in an embodiment of this application, the terminal device determines one or more most significant bits in a binary bit form of the sequence number based on the system frame number, and determines one or more least significant bits in the binary bit form of the sequence number based on the sequence number indication information.

Optionally, in an embodiment of this application, the terminal device determines two parts of the sequence number respectively based on two of the scrambling code, the CRC mask, the bijective transformation parameter, and the cyclic shift information.

Optionally, in an embodiment of this application, the terminal device determines one or more most significant bits in a binary bit form of the sequence number based on the CRC mask, and determines one or more least significant bits in the binary bit form of the sequence number based on the scrambling code.

It should be understood that a manner in which the terminal device determines the sequence number of the synchronization signal block is corresponding to an indication manner used by the network device. To be specific, an indication manner in which the network device indicates the sequence number of the synchronization signal block is a corresponding manner in which the terminal device determines the sequence number of the synchronization signal block. For brevity, details are not described herein.

In the technical solution in this embodiment of this application, the sequence number of the synchronization signal block is indicated by using at least one of the sequence number indication information carried in the broadcast signal, the scrambling code of the broadcast signal, the CRC mask of the broadcast signal, the bijective transformation parameter of the broadcast signal, the cyclic shift information of the broadcast signal on which channel coding has been performed, and the system frame number carried in the broadcast signal, so that the location of the synchronization signal block can be effectively indicated.

It should be understood that specific examples in the embodiments of this application are merely intended to help a person skilled in the art better understand the embodiments of this application, but are not intended to limit the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the signal transmission method in the embodiments of this application, and the following describes a signal transmission apparatus in the embodiments of this application.

Figure 9:
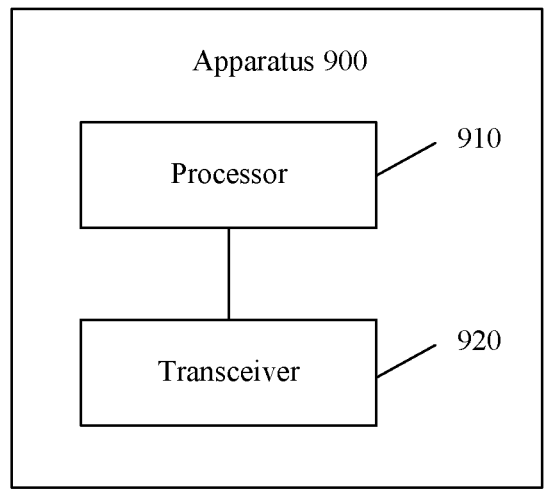
FIG. 9 is a schematic block diagram of a signal transmission apparatus according to an embodiment of this application.

FIG. 9 is a schematic block diagram of a signal transmission apparatus 900 according to an embodiment of this application. The apparatus 900 may be a network device.

It should be understood that the apparatus 900 may be corresponding to the network device in the method embodiments, and may have any function of the network device in the method.

As shown in FIG. 9, the apparatus 900 includes a processor 910 and a transceiver 920.

The processor 910 is configured to generate a synchronization signal block, where the synchronization signal block includes a synchronization signal and a broadcast signal, a sequence number of the synchronization signal block is indicated by using at least one of sequence number indication information carried in the broadcast signal, a scrambling code of the broadcast signal, a cyclic redundancy check CRC mask of the broadcast signal, a bijective transformation parameter of the broadcast signal, cyclic shift information of the broadcast signal on which channel coding has been performed, and a system frame number carried in the broadcast signal, and the sequence number indicates a location of the synchronization signal block in a plurality of synchronization signal blocks.

The transceiver 920 is configured to send the synchronization signal block.

Optionally, in an embodiment of this application, the sequence number of the synchronization signal block is jointly indicated by using two of the sequence number indication information, the scrambling code, the CRC mask, the bijective transformation parameter, the cyclic shift information, and the system frame number.

Optionally, in an embodiment of this application, the sequence number indicates a location of the synchronization signal block in a synchronization signal burst or a synchronization signal burst set.

Optionally, in an embodiment of this application, the sequence number includes two parts, and one part of the sequence number is indicated by using the sequence number indication information; and the other part of the sequence number is indicated by using one of the scrambling code, the CRC mask, the bijective transformation parameter, the cyclic shift information, and the system frame number.

Optionally, in an embodiment of this application, one or more most significant bits in a binary bit form of the sequence number is indicated by using the scrambling code; and one or more least significant bits in the binary bit form of the sequence number is indicated by using the sequence number indication information.

Optionally, in an embodiment of this application, one or more most significant bits in a binary bit form of the sequence number is indicated by using the cyclic shift information; and one or more least significant bits in the binary bit form of the sequence number is indicated by using the sequence number indication information.

Optionally, in an embodiment of this application, one or more most significant bits in a binary bit form of the sequence number is indicated by using the sequence number indication information; and one or more least significant bits in the binary bit form of the sequence number is indicated by using the bijective transformation parameter.

Optionally, in an embodiment of this application, one or more most significant bits in a binary bit form of the sequence number is indicated by using the system frame number; and one or more least significant bits in the binary bit form of the sequence number is indicated by using the sequence number indication information.

Optionally, in an embodiment of this application, the sequence number includes two parts, and the two parts of the sequence number are respectively indicated by using two of the scrambling code, the CRC mask, the bijective transformation parameter, and the cyclic shift information.

Optionally, in an embodiment of this application, one or more most significant bits in a binary bit form of the sequence number is indicated by using the CRC mask; and one or more least significant bits in the binary bit form of the sequence number is indicated by using the scrambling code.

Figure 10:
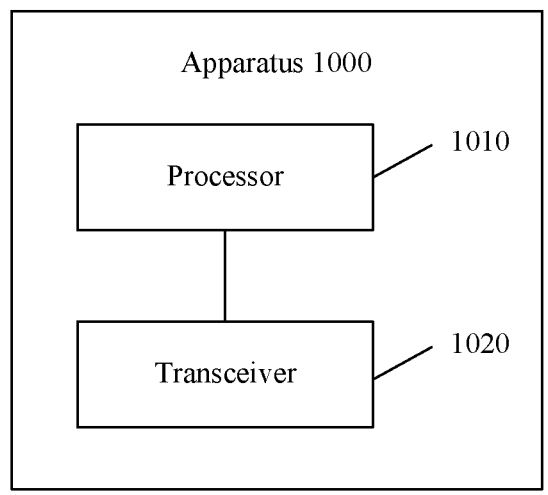
FIG. 10 is a schematic block diagram of a signal transmission apparatus according to another embodiment of this application.

FIG. 10 is a schematic block diagram of a signal transmission apparatus 1000 according to another embodiment of this application. The apparatus 1000 may be a terminal device.

It should be understood that the apparatus 1000 may be corresponding to the terminal device in the method embodiments, and may have any function of the terminal device in the method.

As shown in FIG. 10, the apparatus 1000 includes a processor 1010 and a transceiver 1020.

The transceiver 1020 is configured to detect a synchronization signal block, where the synchronization signal block includes a synchronization signal and a broadcast signal.

The processor 1010 is configured to determine a sequence number of the synchronization signal block based on at least one of sequence number indication information carried in the broadcast signal, a scrambling code of the broadcast signal, a cyclic redundancy check CRC mask of the broadcast signal, a bijective transformation parameter of the broadcast signal, cyclic shift information of the broadcast signal on which channel coding has been performed, and a system frame number carried in the broadcast signal, and the sequence number indicates a location of the synchronization signal block in a plurality of synchronization signal blocks.

Optionally, in an embodiment of this application, the processor 1010 is configured to determine the sequence number based on two of the sequence number indication information, the scrambling code, the CRC mask, the bijective transformation parameter, the cyclic shift information, and the system frame number.

Optionally, in an embodiment of this application, the sequence number indicates a location of the synchronization signal block in a synchronization signal burst or a synchronization signal burst set.

Optionally, in an embodiment of this application, the sequence number includes two pails. The processor 1010 is configured to: determine one part of the sequence number based on the sequence number indication information, and determine the other part of the sequence number based on one of the scrambling code, the CRC mask, the bijective transformation parameter, the cyclic shift information, and the system frame number.

Optionally, in an embodiment of this application, the processor 1010 is configured to: determine one or more most significant bits in a binary bit form of the sequence number based on the scrambling code, and determine one or more least significant bits in the binary bit form of the sequence number based on the sequence number indication information.

Optionally, in an embodiment of this application, the processor 1010 is configured to: determine one or more most significant bits in a binary bit form of the sequence number based on the cyclic shift information, and determine one or more least significant bits in the binary bit form of the sequence number based on the sequence number indication information.

Optionally, in an embodiment of this application, the processor 1010 is configured to: determine one or more most significant bits in a binary bit form of the sequence number based on the sequence number indication information, and determine one or more least significant bits in the binary bit form of the sequence number based on the bijective transformation parameter.

Optionally, in an embodiment of this application, the processor 1010 is configured to: determine one or more most significant bits in a binary bit form of the sequence number based on the system frame number, and determine one or more least significant bits in the binary bit form of the sequence number based on the sequence number indication information.

Optionally, in an embodiment of this application, the sequence number includes two pails. The processor 1010 is configured to determine the two pails of the sequence number respectively based on two of the scrambling code, the CRC mask, the bijective transformation parameter, and the cyclic shift information.

Optionally, in an embodiment of this application, the processor 1010 is configured to: determine one or more most significant bits in a binary bit form of the sequence number based on the CRC mask, and determine one or more least significant bits in the binary bit form of the sequence number based on the scrambling code.

It should be understood that the processor 910 or the processor 1010 in this embodiment of this application may be implemented by using a processing unit or a chip. Optionally, the processing unit may include a plurality of units in an implementation process.

It should be understood that, the transceiver 920 or the transceiver 1020 in this embodiment of this application may be implemented by using a transceiver unit or a chip. Optionally, the transceiver 920 or the transceiver 1020 may include a transmitter and/or a receiver, or may include a transmit unit and/or a receiving unit.

It should be understood that the processor 910 and the transceiver 920 in this embodiment of this application may be implemented by using a chip, and the processor 1010 and the transceiver 1020 in this embodiment of this application may be implemented by using a chip.

Optionally, the network device and the terminal device may further include a memory. The memory may store program code, and the processor invokes the program code stored in the memory to implement corresponding functions of the network device or the terminal device. Optionally, the processor and the memory may be implemented by using a chip.

The apparatus in the implementations of this application may be a field-programmable gate array (FPGA), may be an application-specific integrated circuit (ASIC), may be a system on chip (SoC), may be a central processing unit (CPU), may be a network processor (NP), may be a digital signal processor (DSP), may be a micro control unit (MCU), or may be a programmable device (PLD) or another integrated chip.

An embodiment of this application further provides a chip, configured to implement apparatuses or components in the apparatuses in the foregoing embodiments of this application.

An embodiment of this application further provides a communications system, including the network device in the foregoing network device embodiment and the terminal device in the foregoing terminal device embodiment.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, and the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It should be understood that, the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current solution, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    generating, by a device, a synchronization signal block, wherein the synchronization signal block comprises a synchronization signal and a broadcast signal, a scrambling code of the broadcast signal corresponds to a sequence number of the synchronization signal block, and the sequence number of the synchronization signal block indicates a location of the synchronization signal block in a plurality of synchronization signal blocks, wherein a binary bit form of the sequence number comprises 3 most significant bits and 3 least significant bits, and the 3 least significant bits correspond to the scrambling code, and wherein the 3 most significant bits is indicated by following sequence number indication information carried in the broadcast signal: a cyclic redundancy check (CRC) mask of the broadcast signal, a bijective transformation parameter of the broadcast signal, cyclic shift information of channel coding of the broadcast signal, or a system frame number carried in the broadcast signal; and
    sending, by the device, the synchronization signal block.

2. The method according to claim 1, wherein the scrambling code of the broadcast signal corresponds to all bits of the sequence number of the synchronization signal block.

3. The method according to claim 1, wherein a quantity of the plurality of synchronization signal blocks is 4 or 8.

4. A method, comprising:
    detecting, by a device, a synchronization signal block, wherein the synchronization signal block comprises a synchronization signal and a broadcast signal; and
    determining, by the device, a sequence number of the synchronization signal block, wherein the sequence number of the synchronization signal block corresponds to a scrambling code of the broadcast signal, wherein the sequence number of the synchronization signal block indicates a location of the synchronization signal block in a plurality of synchronization signal blocks, wherein a binary bit form of the sequence number comprises 3 most significant bits and 3 least significant bits, and the 3 least significant bits correspond to the scrambling code, and wherein the 3 most significant bits is indicated by following sequence number indication information carried in the broadcast signal: a cyclic redundancy check (CRC) mask of the broadcast signal, a bijective transformation parameter of the broadcast signal, cyclic shift information of channel coding of the broadcast signal, or a system frame number carried in the broadcast signal.

5. The method according to claim 4, wherein the scrambling code of the broadcast signal corresponds to all bits of the sequence number of the synchronization signal block.

6. The method according to claim 5, wherein a quantity of the plurality of synchronization signal blocks is 4 or 8.

7. An apparatus, comprising:
    a processor configured to generate a synchronization signal block, the synchronization signal block comprises a synchronization signal and a broadcast signal, a scrambling code of the broadcast signal corresponds to a sequence number of the synchronization signal block, and the sequence number of the synchronization signal block indicates a location of the synchronization signal block in a plurality of synchronization signal blocks, wherein a binary bit form of the sequence number comprises 3 most significant bits and 3 least significant bits, and the 3 least significant bits correspond to the scrambling code, and wherein the 3 most significant bits is indicated by following sequence number indication information carried in the broadcast signal: a cyclic redundancy check (CRC) mask of the broadcast signal, a bijective transformation parameter of the broadcast signal, cyclic shift information of channel coding of the broadcast signal, or a system frame number carried in the broadcast signal; and
    a transceiver configured to send the synchronization signal block.

8. The apparatus according to claim 7, wherein the scrambling code of the broadcast signal corresponds to all bits of the sequence number of the synchronization signal block.

9. The apparatus according to claim 8, wherein a quantity of the plurality of synchronization signal blocks is 4 or 8.

10. An apparatus, comprising:
    a transceiver configured to detect a synchronization signal block, wherein the synchronization signal block comprises a synchronization signal and a broadcast signal; and
    a processor configured to determine a sequence number of the synchronization signal block, wherein the sequence number of the synchronization signal block corresponds to a scrambling code of the broadcast signal, and the sequence number of the synchronization signal block indicates a location of the synchronization signal block in a plurality of synchronization signal blocks, wherein a binary bit form of the sequence number comprises 3 most significant bits and 3 least significant bits, and the 3 least significant bits correspond to the scrambling code, and wherein the 3 most significant bits is indicated by following sequence number indication information carried in the broadcast signal: a cyclic redundancy check (CRC) mask of the broadcast signal, a bijective transformation parameter of the broadcast signal, cyclic shift information of channel coding of the broadcast signal, or a system frame number carried in the broadcast signal.

11. The apparatus according to claim 10, wherein the scrambling code of the broadcast signal corresponds to all bits of the sequence number of the synchronization signal block.

12. The apparatus according to claim 11, wherein a quantity of the plurality of synchronization signal blocks is 4 or 8.

13. A non-transitory computer readable storage medium, wherein the non-transitory computer readable storage medium stores a program code, and the program code is used to instruct to a processor perform a method comprising:
   detecting a synchronization signal block, wherein the synchronization signal block comprises a synchronization signal and a broadcast signal; and
   determining a sequence number of the synchronization signal block, wherein the sequence number of the synchronization signal block corresponds to a scrambling code of the broadcast signal, wherein the sequence number of the synchronization signal block indicates a location of the synchronization signal block in a plurality of synchronization signal blocks, wherein a binary bit form of the sequence number comprises 3 most significant bits and 3 least significant bits, and the 3 least significant bits correspond to the scrambling code, wherein the 3 most significant bits is indicated by following sequence number indication information carried in the broadcast signal: a cyclic redundancy check (CRC) mask of the broadcast signal, a bijective transformation parameter of the broadcast signal, cyclic shift information of channel coding of the broadcast signal, or a system frame number carried in the broadcast signal.

* * * * *